United States Patent

[11] 3,600,548

| [72] | Inventor | John C. Bock |
| | | Madison, Wis. |
| [21] | Appl. No. | 53,530 |
| [22] | Filed | July 9, 1970 |
| [45] | Patented | Aug. 17, 1971 |
| [73] | Assignee | Bock Corporation |
| | | Madison, Wis. |

[54] RESISTANCE WELDING APPARATUS
4 Claims, 4 Drawing Figs.

[52] U.S. Cl............................................................ 219/79,
219/107
[51] Int. Cl............................................................. B23k 9/12
[50] Field of Search............................................ 219/78,
107, 98, 99

[56] References Cited
UNITED STATES PATENTS
3,448,236  6/1969  Spisak............................ 219/98
2,550,965  5/1951  Brown........................... 219/107
2,556,318  9/1951  Dalin et al. .................... 219/107

Primary Examiner—J. V. Truhe
Assistant Examiner—Hugh D. Jaeger
Attorneys—Joseph G. Werner, Theodore J. Long, John M. Winter and James A. Kemmeter ABSTRACT: Resistance welding apparatus and method for attaching a series of metal pieces to the inside of a metal tube in a predetermined pattern controlled by longitudinal and rotational indexing of the tube. An electrode arm extends into the tube and has an associated feed track along which the metal pieces are intermittently moved to a welding head on the end of the electrode arm. A piston carried by the welding head and acting against the inside of the wall of the tube moves the welding head transversely of the electrode arm to bring the piece to be welded into pressure contact with the inside of the tube. Current is run through the electrode arm, welding head, piece, tube and a grounded contact to weld the piece to the tube.

INVENTOR.
JOHN C. BOCK

RESISTANCE WELDING APPARATUS

BACKGROUND OF THE INVENTION

The invention relates to a resistance welding apparatus and method for securing pieces within a tubular member. While the apparatus and method have been developed for welding a spiral pattern of metal baffles on the inside wall of a heat exchange tube to increase the heat transfer capabilities of the tube in accordance with the principles discussed in U.S. Pat. Nos. 2,950,740 and 3,349,754, the apparatus and method are, of course, not limited to this particular use.

Resistance welding of the baffles requires high amperage electrical current to pass through the baffles and tube to a grounded contact on the outside of the tube. Difficulty in manufacturing such baffled heat exchange tubes, particularly ones of relatively small diameter, arises because the resistance welding process requires high pressure contact between the baffles and the inside of the tube during welding. Additionally, the high amperage electrical current requires the use of a comparatively large electrode within the tube which complicates the delivery and positioning of baffles in the relatively limited working area within the tube.

SUMMARY OF THE INVENTION

Basically, the invention comprises an improved method and apparatus in a resistance welding machine for securing metal pieces within a metal tube in a predetermined pattern. The invention encompasses the integration of a primary feed track for the pieces with the electrode arm, and reciprocating mechanism for intermittently delivering a single baffle piece to a welding head mounted on the end of the electrode arm for transverse movement within the tube. The welding head has a positioning piston mounted thereon for engaging the inside surface of the tube and moving the welding head transversely of the longitudinal axis of the tube to bring the piece to be welded into high pressure contact with the wall of the tube for welding opposite the positioning piston. The weld is then made by running a high amperage electrical current through the electrode, welding head, piece, tube and a grounded contact which engages the outside surface of the tube opposite the piece.

The improvement comprises a simple and efficient manner of faithfully delivering and positioning a piece under high pressure contact with the inside wall of a metal tube for welding thereto.

Further objects, features and advantages of my invention will be apparent from the following detailed description taken in conjunction with the accompanying drawings showing a preferred embodiment and method exemplifying the principles of my invention.

DESCRIPTION OF A PREFERRED EMBODIMENT AND METHOD

While my improved method and apparatus will be described further herein in conjunction with a welding machine for securing a series of baffle pieces in a spiral pattern in a heat exchange tube, it should be understood that my invention is not limited to that particular use.

Figure 1:
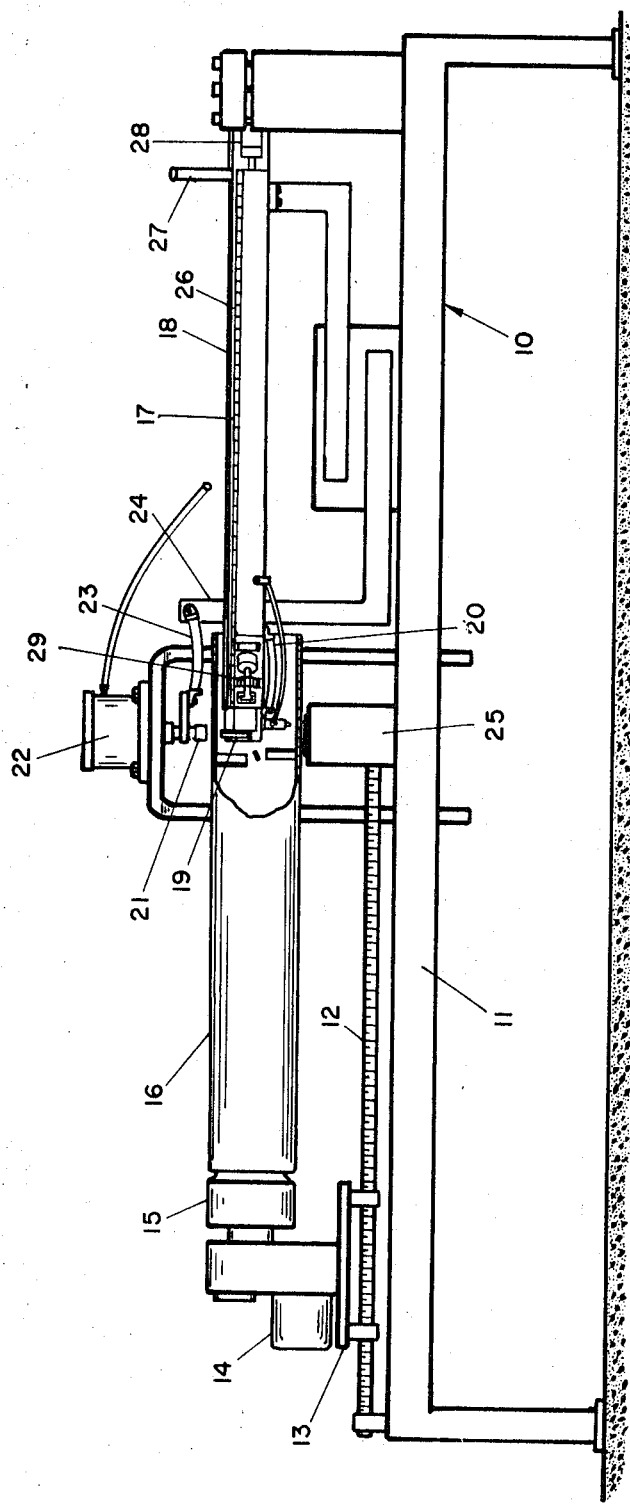
FIG. 1 is a front elevation view generally showing a resistance welding machine incorporating my improved apparatus for welding metal pieces within a tube, a portion of the tube being broken away for clarity.

Referring then more particularly to the drawings wherein like numerals refer to like parts throughout the several views, a resistance welding machine incorporating my improved apparatus is generally shown at 10 in Figure 1. Basically the machine has a frame supported bed 11 with an indexing screw 12 having a carriage assembly 13 adapted to be linearly moved by the rotation of the screw. The carriage assembly has a motor 14 for rotating a tube gripping member 15 which is engaged in one end of the tube 16 in which baffles 17 are to be welded. The gripping member holds the tube in a substantially horizontal cantilevered fashion as shown in FIG. 1. A cantilevered electrode arm 18 if fixedly mounted at the end of the machine opposite the carriage assembly. The electrode arm is aligned so as to extend into the tube as shown. The electrode arm has a welding head 19 mounted at the end thereof in a slotted guide 19a for reciprocal transverse movement within the tube for receiving a piece to be welded and moving that piece into position against the inside surface of the tube for welding. The welding head is conductively connected to the electrode arm by a flexible conductor element 20.

A ground electrode assembly comprises a contact 21 mounted on an air cylinder 22 for reciprocal movement into and out of contact with the external surface of the tube. The reciprocal contact is conductively connected by a second flexible conductor element 23 to an electrode arm 24.

Figure 2:
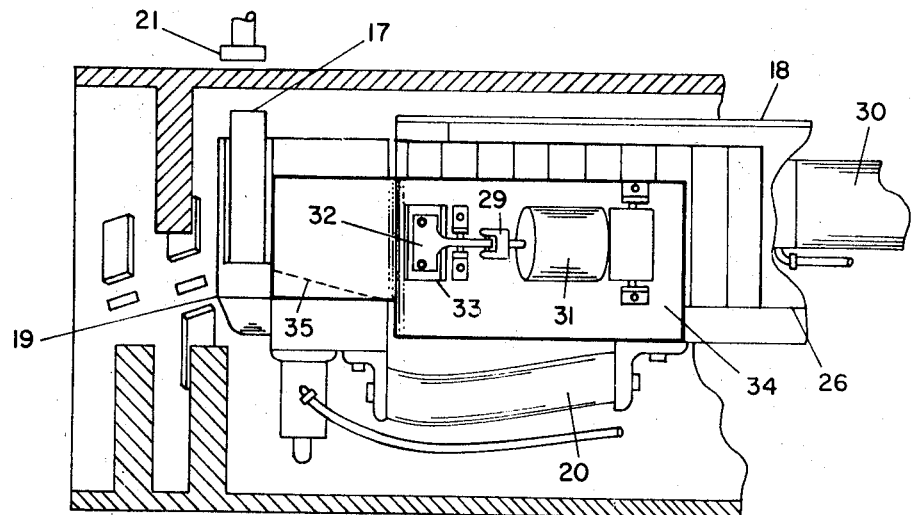
FIG. 2 is an enlarged front elevation view of a portion of the apparatus shown in FIG. 1 with the welding head in its retracted, piece receiving position.

An abutment member 25 is mounted on the machine bed opposite the reciprocal grounded contact 21. The abutment member is positioned in closely spaced relation with the tube to provide a stop for maintaining the tube in substantial longitudinal alignment when contact 21 is driven against the tube. FIGS. 1 and 2 show the reciprocal contact 21 and welding head 19 in their retracted positions and the tube in slightly spaced relation with the abutment 25 so that the tube can be indexed, that is, moved longitudinally and rotated slightly for welding the next piece in position.

Figure 3:
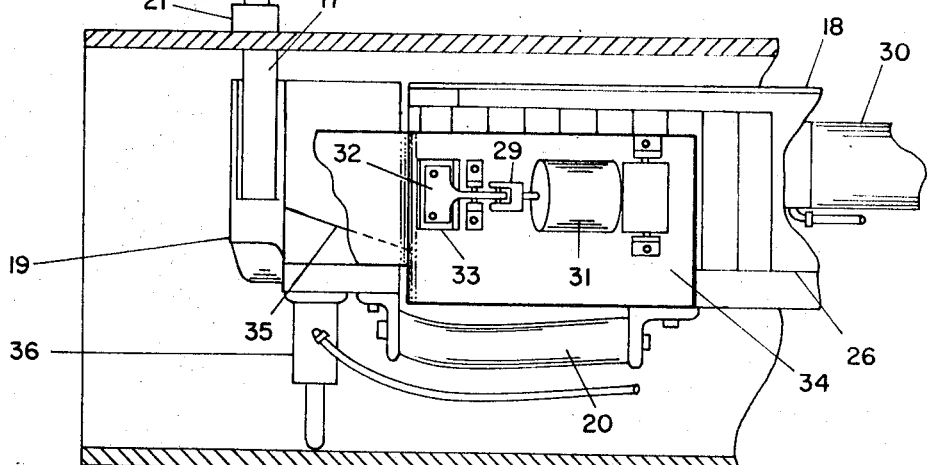
FIG. 3 is an enlarged front elevation view similar to FIG. 2 showing the welding head in its extended position wherein the piece to be welded is held against the inside surface of the tube.

Figure 3 shows the contact 21 in extended position against the exterior surface of the tube. The force of the contact is counteracted by the abutment 25 which is engaged against the tube opposite the contact. While the abutment is shown in the drawings as a stationary member against which the tube is moved by the force of the contact, it is understood that the abutment can be in the form of a moveable stop which would move into and out of engagement with the tube at the same time as the contact.

Figure 4:
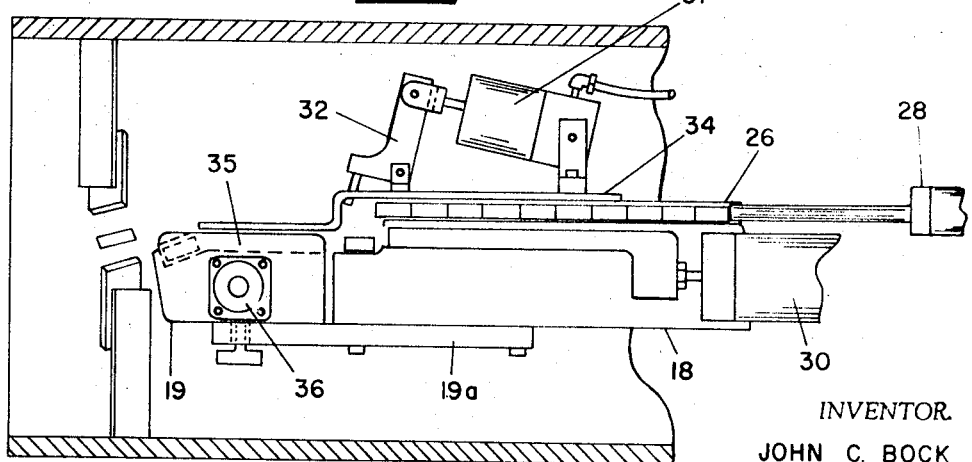
FIG. 4 is a bottom view of the apparatus shown in Figures 2 and 3 with a portion of the bottom removed for clarity.

The cantilevered electrode arm 18 has a primary feed track 26 formed therealong to which the pieces or baffles 17 are delivered by a chute 27 into which they are manually fed. The pieces are pushed along the primary feed track in single file by the piston of an air cylinder, a portion of which is shown at 28 in FIGS. 1 and 4. As each piece reaches the end of the primary feed track 26, an assembly commonly called a slicer and generally indicated by numeral 29 displaces the lead piece out of the single file line to a position in front of a second reciprocally acting piston of an air cylinder 30. The slicer assembly comprises a pivotally mounted air cylinder 31 operating a pivotal slicer arm 32 which engages the lead piece through an opening 33 in a guide plate 34. When the piston 28 has moved the lead piece to the end of the primary feed track 26 opposite the slicer arm 32, air cylinder 31 is actuated to pivot the slicer arm for moving the lead piece out of the primary feed track to a position adjacent the end of the piston of air cylinder 30 as shown in FIG. 4. Air cylinder 30 is then actuated to extend the piston thereof and push the piece along a secondary feed track 35 to the end of the welding head 19. The grounded contact 21 is then extended by air cylinder 22 which moves the tube slightly into engagement with the abutment 25 as shown in FIG. 3. A hydraulic positioning piston 36 then drives the welding head 19 from its retracted piece receiving position shown in FIG. 2 to its extended position shown in FIG. 3 whereby the piece to be welded, shown at 17 in FIG. 3, is held in pressure contact with the inside surface of the tube 16. A sufficiently high amperage electrical current is then run through the electrode 18 and its associated flexible conductor element 20, welding head 19, baffle piece 17, tube 16, contact 21 and its associated flexible conductor element 23, and electrode arm 24 to complete the weld.

In order to achieve the aforementioned spiral pattern, the tube is moved to a new position after each baffle piece is welded. The first weld is made with the tube as far onto the cantilevered electrode arm 18 as may be desired for the beginning of the baffles. After each baffle piece is welded, the tube is then rotated slightly by rotation of gripping member 15 and backed-off the electrode arm by indexing screw 12. This rotational and longitudinal movement of the tube is preferably carried on at the same time that the baffle pieces are moved along the primary feed track of the electrode arm and the lead baffle piece moved into position on the welding head. The cycle is repeated until the desired number of baffles have been welded in the tube. The tube is then removed from the machine by loosening gripping member 15 and another tube positioned thereon and readied for welding.

It is understood that the present invention is not confined to the particular steps, construction or arrangement of parts herein illustrated and described for exemplification, but embraces all such modified forms thereof as come within the scope of the following claims.

I claim:

1. In a resistance welding machine for welding metal pieces to the inside surface of a metal tube, the improvement comprising:

a. means for holding the tube in which the pieces are to be welded,
b. a primary feed track for delivery of a plurality of the pieces in single file line into said tube,
c. a welding head mounted at the end of said primary feed track for movement transversely of the longitudinal axis of the tube between a retracted piece receiving position and a transversely extended welding position, said welding head having a secondary feed track positioned to receive the lead piece from said primary feed track when said welding head is in said retracted piece receiving position,
d. means for moving said lead piece along the secondary feed track to the end thereof,
e. positioning means attached to said welding head for moving said welding head from said piece receiving position to said welding position to maintain the piece on said welding head in pressure contact with the inside surface of said tube, and
f. means for running an electrical current through the piece on said welding head and the tube to weld said piece to said tube.

2. The improvement as specified in claim 1 comprising a cantilevered electrode substantially aligned with the tube holding means for extending into a tube secured by said tube holding means, said primary feed track extending along said cantilevered electrode, and means for intermittently advancing said pieces along said primary feed track.

3. The improvement as specified in claim 1 wherein said tube holding means has indexing means associated therewith for rotating and linearly moving said tube.

4. The improvement as specified in claim 1 wherein said positioning means comprises a piston on said welding head for engaging against the inside surface of said tube to move said welding from said piece receiving position to said welding position.